United States Patent [19]

Kleine

[11] 4,404,868
[45] Sep. 20, 1983

[54] WAGON TRANSMISSION

[76] Inventor: William H. Kleine, R.D. #1, McGraw, N.Y. 13101

[21] Appl. No.: 385,074

[22] Filed: Jun. 4, 1982

[51] Int. Cl.³ .................. F16H 37/06; A01C 19/00; A01C 17/00
[52] U.S. Cl. .................. 74/665 GE; 239/672; 239/684; 74/665 G
[58] Field of Search ..... 74/665 G, 665 GA, 665 GD, 74/665 GE, 665 F; 239/670, 672, 679, 684

[56] References Cited

U.S. PATENT DOCUMENTS 2,956,808 10/1960 Miller .................................. 239/670
3,014,729 12/1961 Henningsen et al. .............. 239/670
3,851,537 12/1974 Nickstadt ............................. 74/404

FOREIGN PATENT DOCUMENTS 445937 1/1948 Canada .......................... 74/665 GA
85929 7/1958 Denmark ............................ 239/672
1200208 2/1958 France ............................... 239/679

OTHER PUBLICATIONS

Predelivery Instructions for the John Deere Model "N" Spreader, 1955, no pertinent pages.

Primary Examiner—Kenneth Dorner
Assistant Examiner—D. Wright
Attorney, Agent, or Firm—Bruns & Jenney

[57] ABSTRACT

A drive for an agricultural machine; such as a forage wagon or heavy duty spreader apron; the drive including a drive shaft of apron chains being powered by transmissions that are fully enclosed so as to not get clogged with mud or ice and the like, the transmission being powered from a power take-off of a tractor.

3 Claims, 2 Drawing Figures

WAGON TRANSMISSION

BACKGROUND OF THE INVENTION

This invention relates generally to a heavy duty spreader and, in particular, to a drive for a heavy duty spreader.

Farm equipment and in particular, wagons for spreading manure and the like are exposed to all kinds of adverse conditions whereupon the parts of the wagon can become contaminated with dirt, mud, ice and other foreign material which can clog the power translating components thereof. Usually, the drive train system of the wagon, which connects the beater chain and the apron to the drive take-off of a tractor, is generally left unprotected from foreign matter and the like which leads to an early breakdown of the equipment and relatively high maintenance costs. Similarly, because of breakdown, the equipment is out of service for long periods of time and productivity of the farmer is adversely affected.

In the present invention a power train that is ideally suited for use in conjunction with a farm wagon of the type that is drawn behind a tractor draws its power from the prime mover (tractor) to drive the apron chains and beaters. As noted above the transmission system associated with this type of system has usually been fully exposed to the elements and is not designed to hold lubricants such as oil or grease. As a consequence it can become rusted and failure ensues. As will become apparent from the present disclosure, a dual power take-off system is provided for a heavy duty spreader that is housed within protective baths of oil so that the system will deliver smooth and continuous power under all types of adverse conditions.

In U.S. Pat. No. 3,851,537 to Nickstadt there is disclosed a gear drive transmission for driving two separate output shafts in opposite directions. However, this patent fails to disclose an enclosed system capable of driving the apron and beaters of a farm wagon.

SUMMARY OF THE INVENTION

It is therefore an object of the present invention to improve farm wagons.

It is a further object of the present invention to improve the transmission systems used in heavy duty spreaders of the type having aprons and beaters.

A further object of the present invention is to provide a fully enclosed power transmission for a heavy duty spreader wagon that bathes the gears in a lubricant.

These and other objects of the present invention are attained by means of a power train for driving the beaters and spreader apron chains of an agricultural wagon that includes a pair of power take-off shafts couplings for connecting the shafts to the power take-off of a prime mover such as a tractor whereby the shafts are caused to rotate, a pair of transmissions for connecting both take-off shafts to a common main shaft that houses meshing gears in an oil bath, a beater connector affixed to each end of the main shaft outboard of the two transmissions and an apron chain connector also affixed to the main shaft inboard of the two transmissions.

BRIEF DESCRIPTION OF THE DRAWINGS

For a better understanding of these and other objects of the present invention, reference is had to the following detailed description of the invention that is to be read in conjunction with the accompanying drawings wherein.

DESCRIPTION OF THE INVENTION

Figures 1, 2:
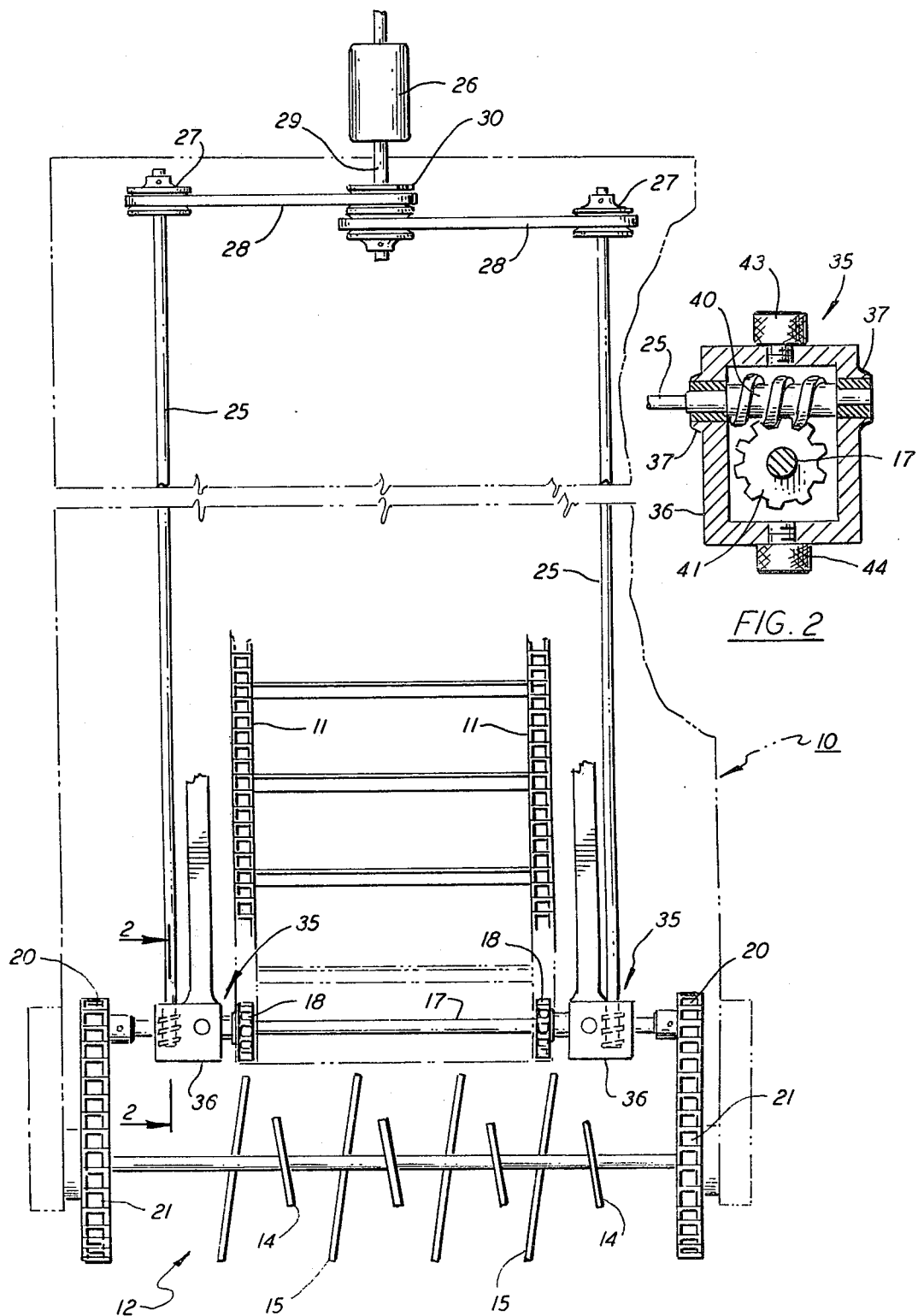
FIG. 1 is a top plane view of an agricultural wagon embodying the teachings of the present invention.
FIG. 2 is an enlarged view in section showing one of the two transmissions used in the present invention.

With further reference to the drawings, there is shown in FIG. 1 a plan view of a typical farm wagon that embodies the teachings of the present invention. A wagon 10 is shown in phantom outline that includes a pair of apron chains 11—11 and a beater assembly 12 mounted at the rear of the wagon. Although not shown, the apron chains are arranged to drive a material transporting apron rearwardly toward the beater bars 14 and 15.

The drive for the present invention includes a main shaft 17 on which sprockets 18—18 are secured to drive the chains 11—11 of a heavy duty spreader (not shown) that can be of any suitable design. The main shaft also has gears 20—20 affixed to the opposite ends thereof for actively engaging the beater drive gears 21—21 or alternately drive the sprocket which turns the beater bars.

The power train that drives the main shaft 11 includes a pair of parallel power take-off shafts 25—25 that are coupled to the power take-off gear box 26 of a prime mover (not shown) such as a tractor. Each power take-off shaft has a V-pulley 27—27 affixed to the end thereof. Each pulley is fitted with a belt 28—28 that is passed around a dual pulley assembly 30 secured to the output shaft 31 of the tractor take-off gear box whereby the power take-off shafts rotate at the same speed.

Power from each of the two power take-off shafts 25—25 is translated to the main drive shaft 11 via a pair of transmissions 35—35. The main drive shaft passes laterally through both transmission housings 36—36 (FIG. 2). As can be seen the apron chain sprockets 18—18 are positioned inside of the housings while the beater gears 20—20 are positioned outside of the transmissions. Accordingly, the forces exerted upon the shaft by the apron and the beater are to a large extent equalized on either side of the housing to enable the transmission to translate power smoothly to each drive section.

Each transmission includes the noted housing 36 having bearing blocks 37—37 in the opposing side walls in which the take-off shaft 25 is journalled for rotation. The main shaft 11 is similarly mounted in the two end walls of the housing so that the main shaft passes beneath the take-off shaft as best illustrated in FIG. 2. A worm 40 is secured to the power take-off shaft and is contained within the housing. The worm meshes with a worm gear 41 that is secured to the main drive shaft. The interior of each housing is filled with oil which is passed into the housing or drained therefrom by means of plugs 43-44 threaded into the top and bottom walls of the housing.

While this invention has been described with reference to the details as set forth above, it is not limited to the specific structure as disclosed and the invention is intended to cover any modifications or changes as may come within the scope of the following claims.

I claim:

1. In an agricultural wagon of the type having beaters, a spreader apron and a power train for driving the beaters and the spreader apron, said wagon further including a prime mover having a gear box, a pair of power take-off shafts coupled to the gear box so that both shafts rotate at the same speed, a common main shaft connected to the pair of take-off shafts by a pair of transmissions that are spaced apart along the main shaft whereby the main shaft passes through both transmissions, each of said transmissions including a housing for enclosing a gearset within an oil bath, a pair of beater sprockets affixed to the main shaft with a beater sprocket being located on either side of the transmission pair, and a pair of apron sprockets also affixed to the main shaft between the transmission pair.

2. The agricultural wagon of claim 1 wherein the gearset contained within each transmission constitutes a worm gearset that includes a worm gear and a worm wheel.

3. The agricultural wagon of claim 1 wherein each transmission housing includes a plug means for bringing oil into and out of said transmission housing.

* * * * *